US012151185B1

(12) United States Patent
Ni et al.

(10) Patent No.: US 12,151,185 B1
(45) Date of Patent: Nov. 26, 2024

(54) DEVICE AND METHOD FOR CONTROLLING DIFFUSION OF MPS CARRIED WITH ARGS IN WASTE WATER TREATMENT SYSTEM

(71) Applicant: Nanjing Institute of Environmental Sciences, MEE, Nanjing (CN)

(72) Inventors: Ni Ni, Nanjing (CN); Na Wang, Nanjing (CN); Renyong Shi, Nanjing (CN); Xinyan Guo, Nanjing (CN); Changqing Zhu, Nanjing (CN); Yang Song, Nanjing (CN)

(73) Assignee: Nanjing Institute of Environmental Sciences, MEE, Nanjing (CN)

( * ) Notice: Subject to any disclaimer, the term of this patent is extended or adjusted under 35 U.S.C. 154(b) by 0 days.

(21) Appl. No.: 18/743,123

(22) Filed: Jun. 14, 2024

(30) Foreign Application Priority Data

Jun. 25, 2023 (CN) .......................... 202310751327.1

(51) Int. Cl.
*B01D 21/00* (2006.01)
*B01D 21/02* (2006.01)
(Continued)

(52) U.S. Cl.
CPC ..... *B01D 21/0084* (2013.01); *B01D 21/0009* (2013.01); *B01D 21/0012* (2013.01);
(Continued)

(58) Field of Classification Search
CPC ........... B01D 21/0084; B01D 21/0009; B01D 21/0012; B01D 21/10; B01D 21/2433;
(Continued)

(56) References Cited

U.S. PATENT DOCUMENTS 5,275,732 A * 1/1994 Wang ................... B03D 1/1462
210/603

FOREIGN PATENT DOCUMENTS

CN 107324583 A * 11/2017 ................ C02F 9/00
CN 112358064 A 2/2021
(Continued)

OTHER PUBLICATIONS

Search Report, issued Beijing Yankai Intellectual Property Agency for Chinese Patent Application No. CN202310751327.1 (priority application), dated Jun. 5, 2024.
(Continued)

*Primary Examiner* — Liam Royce
(74) *Attorney, Agent, or Firm* — Zhu Lehnhoff LLP (57) ABSTRACT

The present disclosure relates to the technical field of waste water treatment, and provides a device and a method for controlling diffusion of MPs (Microplastics) carried with ARGs (Antibiotic Resistance Genes) in a waste water treatment system. The device includes a water collection tank arranged on a mounting rack, a collection assembly arranged inside the water collection tank and used for collecting MPs carried with ARGs in waste water, and a treatment assembly arranged inside the water collection tank and used for removing the collected MPs carried with ARGs in waste water. According to the method, sorting treatment for the MPs carried with ARGs in waste water is realized effectively with an air flotation principle and an electric separation principle. The device is simple in integral structure, and has the advantage of convenience in mounting.

18 Claims, 6 Drawing Sheets

(51) Int. Cl.
  *B01D 21/24* (2006.01)
  *C02F 1/00* (2023.01)
  *C02F 1/24* (2023.01)
  *C02F 1/48* (2023.01)
  *C02F 101/30* (2006.01)

(52) U.S. Cl.
  CPC ......... *B01D 21/10* (2013.01); *B01D 21/2433* (2013.01); *C02F 1/004* (2013.01); *C02F 1/24* (2013.01); *C02F 1/48* (2013.01); *C02F 2101/30* (2013.01)

(58) Field of Classification Search
  CPC .... C02F 1/004; C02F 1/24; C02F 1/48; C02F 2101/30
  See application file for complete search history.

(56) References Cited

FOREIGN PATENT DOCUMENTS

| | | |
|---|---|---|
| CN | 212731224 U | 3/2021 |
| CN | 214693395 U | 11/2021 |
| CN | 215387889 U | 1/2022 |
| CN | 215480153 U | 1/2022 |
| CN | 114031167 A | 2/2022 |
| CN | 115343127 A | 11/2022 |
| CN | 115385438 A | 11/2022 |
| KR | 20210135051 A | 11/2021 |
| KR | 20220158298 A | 12/2022 |

OTHER PUBLICATIONS

Notice of Grant of Patent Rights, issued in CN202310751327.1 (priority application), by CNIPA, dated Jun. 4, 2024.

* cited by examiner

DEVICE AND METHOD FOR CONTROLLING DIFFUSION OF MPS CARRIED WITH ARGS IN WASTE WATER TREATMENT SYSTEM

REFERENCE TO RELATED APPLICATIONS

The present application claims the priority of Chinese patent application No. 202310751327.1, filed on 2023 Jun. 25, the entire disclose of which is incorporated herein by reference.

TECHNICAL FIELD

The present disclosure relates to the technical field of waste water treatment, in particular to a device and a method for controlling diffusion of MPs (Microplastics) carried with ARGs (Antibiotic Resistance Genes) in a waste water treatment system.

BACKGROUND

MPs are microplastics. As new pollutants, microplastics in the environment have the characteristics of small particle size, large specific surface area and easy aging, and can adsorb other pollutants to form combined pollution of microplastics, so that higher ecological toxicity is generated.

ARGs are antibiotic resistance genes. The combined pollution of MPs and ARGs has attracted more and more attention because of unique ecological and environmental effects. Because the combined pollution of MPs and ARGs can not only cause great pollution to the ecological environment, but also cause great toxicity to human health since MPs and ARGs enter the human body after long-time enrichment through the food chain. Therefore, control for the diffusion of MPs carried with ARGs in waste water has become a major issue to solve water environmental pollution.

Because the existing waste water treatment system is free of effective treatment equipment for waste water after combined pollution of MPs and ARGs, it is difficult to control the diffusion of MPs carried with ARGs in the treatment of water after combined pollution of MPs and ARGs.

SUMMARY

The technical scheme of the present disclosure is as follows. A device for controlling diffusion of MPs carried with ARGs in a waste water treatment system includes a water collection tank arranged on a mounting rack, a collection assembly arranged inside the water collection tank and used for collecting MPs carried with ARGs in waste water, and a treatment assembly arranged inside the water collection tank and used for removing the collected MPs carried with ARGs in waste water.

The treatment assembly includes a treatment tank arranged inside the water collection tank in a sleeving manner, a first treatment component for treating MPs inside the treatment tank, and a second treatment component for treating ARGs inside the treatment tank.

The collection assembly includes a lower screening slot located at a bottom end of the interior of the water collection tank, an upper screening slot which is embedded in the treatment tank and provided with a lower port extending into the lower screening slot, an aeration plate arranged inside the upper screening slot, a charged assembly arranged inside the upper screening slot and located above the aeration plate, and an electrode disc located at an upper port of the upper screening slot.

The lower screening slot includes a first screening slot of a disc-like structure, and a screening grill arranged on the first screening slot.

The upper screening slot includes a communicating pipe which is provided with a lower end penetrating through the screening grill and located inside the first screening pipe, and a second screening slot which is connected with an upper end of the communicating pipe and is of a tubular structure; a first negative-pressure impeller is arranged inside the second screening slot, and a driving assembly for providing power for the first negative-pressure impeller is arranged on the water collection tank; the aeration plate is arranged inside the second screening tank, and gas supply equipment connected with the aeration plate is arranged on the water collection tank.

The charged assembly includes a cushion hopper which is arranged inside the second screening slot and provided with a cushion notch in the surface, and a charge friction plate group located directly above the cushion hopper.

The electrode disc is located at an upper end port of the second screening slot.

Further, a second negative-pressure impeller is arranged inside the first screening slot; the second negative-pressure impeller is located below the screening grill, and the second negative-pressure impeller and the first negative-pressure impeller are driven by a same output shaft.

Description: drainage of waste water inside the water collection tank into the first screening slot is realized through the arrangement of the second negative-pressure impeller, and then the waste water is drained into the second screening slot through the first negative-pressure impeller, so that the waste water can flow more smoothly.

Further, the aeration plate includes an aeration plate body provided with communicating slots in the surface, a plurality of aeration plates embedded in an upper surface of the aeration plate body, and a connecting pipeline arranged inside the aeration plate body.

Description: slow flowing of waste water is realized by using the aeration plate body, the flow velocity of the waste water is reduced after the waste water passes through the communicating slot, aeration treatment is realized by using the aeration plate, and the water flow can be accelerated through air flotation flowing.

Further, each of the communicating slots includes two V-shaped slots formed in upper and lower surfaces of the aeration plate body respectively, and a straight slot for connecting the two V-shaped slots; an aeration port is formed in a slot wall of the V-shaped slot; and the connecting pipeline is respectively connected with the aeration port and an aeration disc.

Description: slow speed of the waste water when the waste water passes through the communicating slot is realized by using the V-shaped slots, and the aeration effect can be effectively improved through the arrangement of the V-shaped slot at the aeration port.

Further, the charge friction plate group includes a mounting base, and a plurality of plate assemblies circumferentially arranged on the mounting base.

Each of the plate assemblies includes two clamping plates arranged at intervals, a closed plate which is arranged between the two clamping plates and forms a friction chamber with the clamping plates, a plurality of diversion trenches arranged inside the friction chamber, and a friction rod group arranged inside the diversion trenches; and openings are respectively formed in upper and lower ends of the friction chamber and side walls of the diversion trenches.

Description: the introduction of the waste water into the friction chamber to sufficiently rub with the friction rod group for friction charge effect is realized by using the plate assembly. The MPs can be carried with charges, and then the MPs are adsorbed through the electrode disc, so that the MPs carried with ARGs can be gathered at the upper port of the second screening slot.

Further, the mounting base is arranged on an inner wall of the upper screening slot through a mounting support.

Description: stable mounting for the mounting support is realized by using the mounting support, so that the waste water can be effectively in contact with the charge friction plate group when the waste water passes through the charge friction plate group.

Further, the mounting base is arranged on an output shaft, for providing power for the first negative-pressure impeller, of the driving assembly through a shaft sleeve.

Explanation: the charge friction plate group can rotate inside the second screening slot by mounting the shaft sleeve, so that the contact rate of the waste water and the charge friction plate group can be improved, and then the friction efficiency is improved.

Further, the electrode disc includes a mounting chassis, a conical disc arranged on a lower surface of the mounting chassis and coaxial with the mounting chassis, and a plurality of electrode plates circumferentially arranged on the mounting chassis along an outer side wall of the conical disc.

Description: the mounting chassis can be mounted on the output shaft of the driving assembly in virtue of a sleeve to satisfy the structural layout of the device. The MPs carried with friction charges is adsorbed by the electrode plate so that the MPs are concentrated and floated at the upper port of the second screening slot. The MPs carried with ARGs can be concentrated towards the edge of the upper port of the second screening slot through the arrangement of the conical disc. Along with continuous water inflowing, the MPs carried with ARGs can overflow to fall into the treatment tank, and then effective screening and separation for the MPs carried with ARGs in the waste water are realized.

Further, guide slots are formed in the mounting chassis, and the guide slots are arranged between the adjacent electrode plates at intervals.

Description: through the arrangement of the guide slot, the MPs carried with ARGs flow towards the edge of the upper port of the second screening slot.

Further, a method for controlling diffusion of MPs carried with ARGs in a waste water treatment system includes the following steps: waste water enters into the water collection tank through a water inlet of the water collection tank; negative pressure is formed inside the second screening slot after the first negative-pressure impeller is driven by the driving assembly to operate; a flowing water flow is formed inside the water collection tank; the waste water enters the second screening slot through the first screening slot and the communicating pipe in sequence after penetrating through the screening grill by negative pressure; aeration treatment is carried out through the aeration plate so that air flotation is realized for the MPs carried with ARGs; after the waste water passes through the cushion hopper, the MPs carried with ARGs in the waste water rub with the charge friction plate group to be carried with charges; when the water level reaches an upper end face of the second screening slot, the MPs carried with charges are adsorbed by the electrode disc; water inflows continuously, and the MPs carried with ARGs enters the treatment tank; and then, the MPs and ARGs are treated through the first treatment component and the second treatment component respectively.

Compared with the prior art, the present disclosure has the following beneficial effects.

The device in the present disclosure is reasonable in design of integral structure, and sorting treatment for the MPs carried with ARGs in the waste water is effectively realized with an air flotation principle and an electric separation principle.

The water flow is effectively guided through the lower screening slot and the upper screening slot, and the first negative-pressure impeller mounted inside the upper screening slot is matched to promote the flowing of the water flow. Wherein, the air flotation principle is realized in cooperation with the aeration plate on the flowing path of the water flow. Wherein, the friction charge principle is realized in cooperation with the charged assembly on the flowing path of the water flow, and then the electric separation principle is realized in cooperation with the electrode disc. The MPs carried with ARGs in waste water can be gathered at the upper end port of the second screening slot, and the MPs carried with ARGs in waste water can be separated as the water continues to fall into the treatment tank.

The device in the present disclosure is simple in integral structure and has the advantage of convenience in mounting. The device can be mounted at the front end of the waste water treatment system to realize screening and separation for the MPs carried with ARGs in waste water. The equipment has the advantages of low cost and low operation cost, and is beneficial to popularization.

Reference signs: 1, water collection tank; 10, mounting rack; 11, water inlet; 12, first water outlet; 13, second water outlet; 2, collection assembly; 21, lower screening slot; 211, first screening slot; 212, screening grill; 213, second negative-pressure impeller; 22, upper screening slot; 221, communicating pipe; 222, second screening slot; 223, first negative-pressure impeller; 23, aeration plate; 231, communicating slot; 2310, aeration port; 2311, V-shaped slot; 2312, straight slot; 232, aeration plate body; 233, aeration disc; 24, charged assembly; 241, cushion hopper; 2410, cushion notch; 242, charge friction plate group; 2420, mounting base; 2421, mounting support; 2422, shaft sleeve; 25, electrode disc; 251, mounting chassis; 2510, guide slot; 252, conical disc; 253, electrode plate; 3, treatment assembly; 31, treatment tank; 4, plate assembly; 40, friction chamber; 41, clamping plate; 42, closed plate; 43, diversion trench; and 44, friction rod group.

DETAILED DESCRIPTION OF THE EMBODIMENTS

Embodiment I

Figure 1:
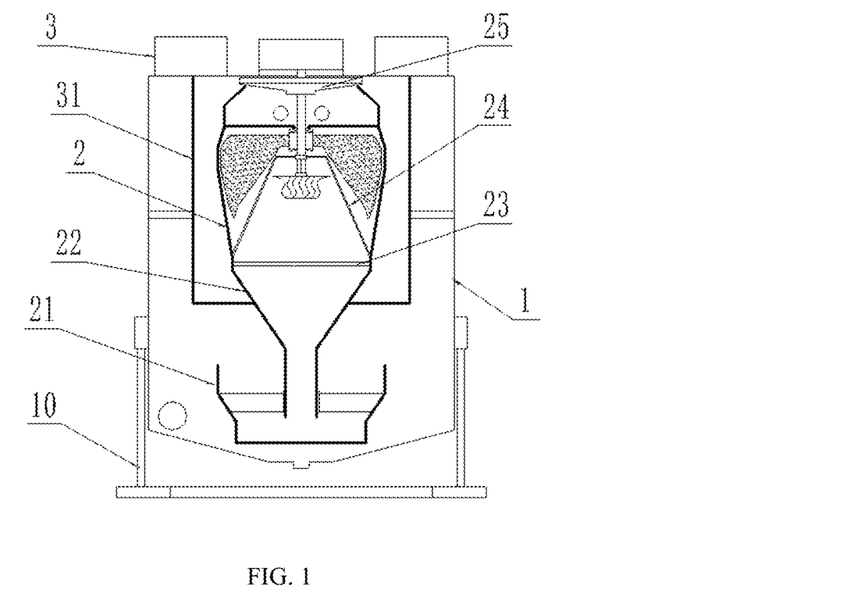
FIG. 1 is a schematic diagram of an internal structure in the present disclosure.
Figure 2:
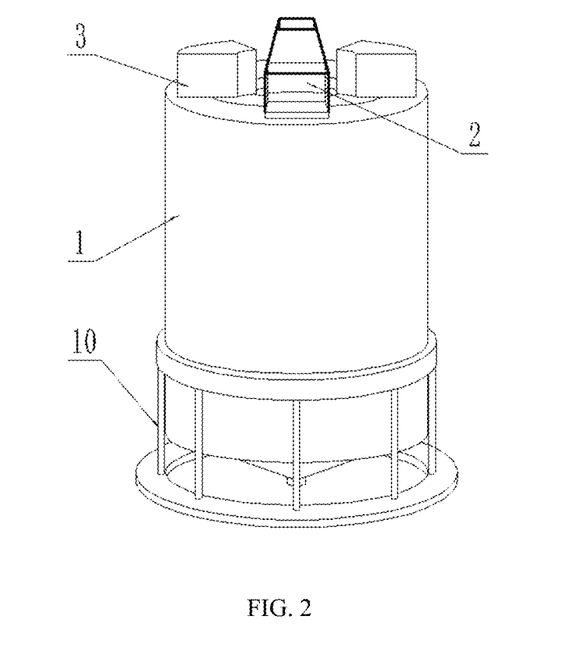
FIG. 2 is a schematic diagram of an external structure in the present disclosure.

A device for controlling diffusion of MPs carried with ARGs in a waste water treatment system as shown in FIG. 1 and FIG. 2 includes a water collection tank 1 arranged on a mounting rack 10, a collection assembly 2 arranged inside the water collection tank 1 and used for collecting MPs carried with ARGs in waste water, and a treatment assembly 3 arranged inside the water collection tank 1 and used for removing the collected MPs carried with ARGs in waste water.

Figure 3:
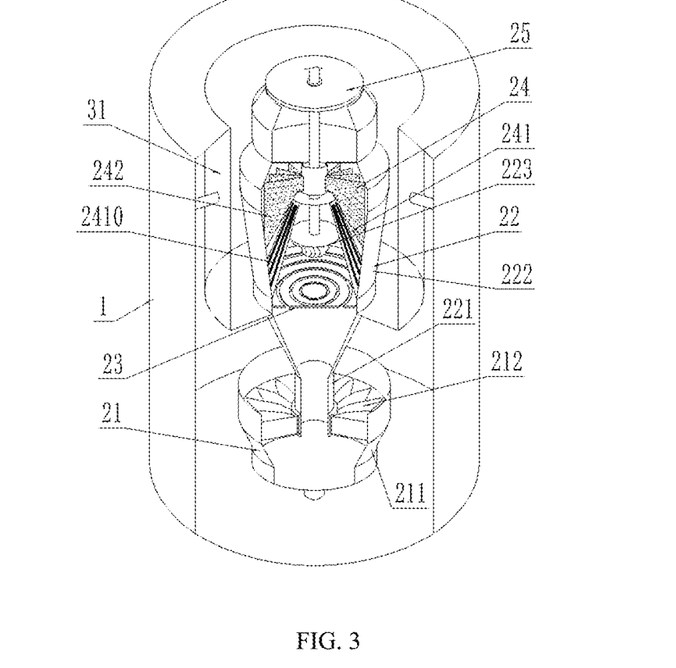
FIG. 3 is a schematic diagram of an internal structure of a water collection tank in the first, second and third embodiments of the present disclosure.

As shown in FIG. 1 and FIG. 3, the treatment assembly 3 includes a treatment tank 31 arranged inside the water collection tank 1 in a sleeving manner, a first treatment component for treating MPs inside the treatment tank 31, and a second treatment component for treating ARGs inside the treatment tank 31.

As shown in FIG. 1 and FIG. 3, the collection assembly 2 includes a lower screening slot 21 located at a bottom end of the interior of the water collection tank 1, an upper screening slot 22 which is embedded in the treatment tank 31 and provided with a lower port extending into the lower screening slot 21, an aeration plate 23 arranged inside the upper screening slot 22, a charged assembly 24 arranged inside the upper screening slot 22 and located above the aeration plate 23, and an electrode disc 25 located at an upper port of the upper screening slot 22.

The lower screening slot 21 includes a first screening slot 211 of a disc-like structure, and a screening grill 212 arranged on the first screening slot 211.

The upper screening slot 22 includes a communicating pipe 221 which is provided with a lower end penetrating through the screening grill 212 and located inside the first screening pipe 211, and a second screening slot 222 which is connected with an upper end of the communicating pipe 221 and is of a tubular structure. A first negative-pressure impeller 223 is arranged inside the second screening slot 222, and a driving assembly for providing power for the first negative-pressure impeller 223 is arranged on the water collection tank 1. The aeration plate 23 is arranged inside the second screening tank 222, and gas supply equipment connected with the aeration plate 23 is arranged on the water collection tank 1. The aeration plate 23 is a commercially available aeration plate.

The charged assembly 24 includes a cushion hopper 241 which is arranged inside the second screening slot 222 and provided with a cushion notch 2410 in the surface, and a charge friction plate group 242 located directly above the cushion hopper 241.

Figure 4:
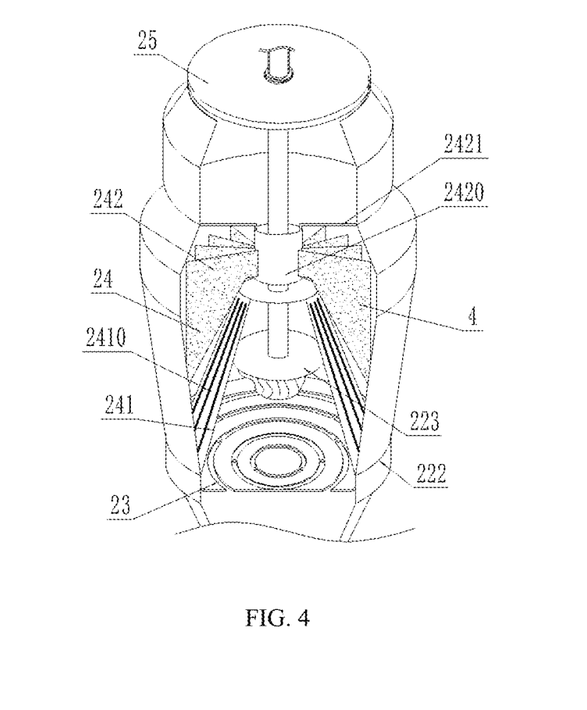
FIG. 4 is a schematic diagram of an internal local structure of an upper screening slot in the first embodiment of the present disclosure.

As shown in FIG. 4, the charge friction plate group 242 includes a mounting base 2420, and a plurality of plate assemblies 4 circumferentially arranged on the mounting base 2420.

Figure 8:
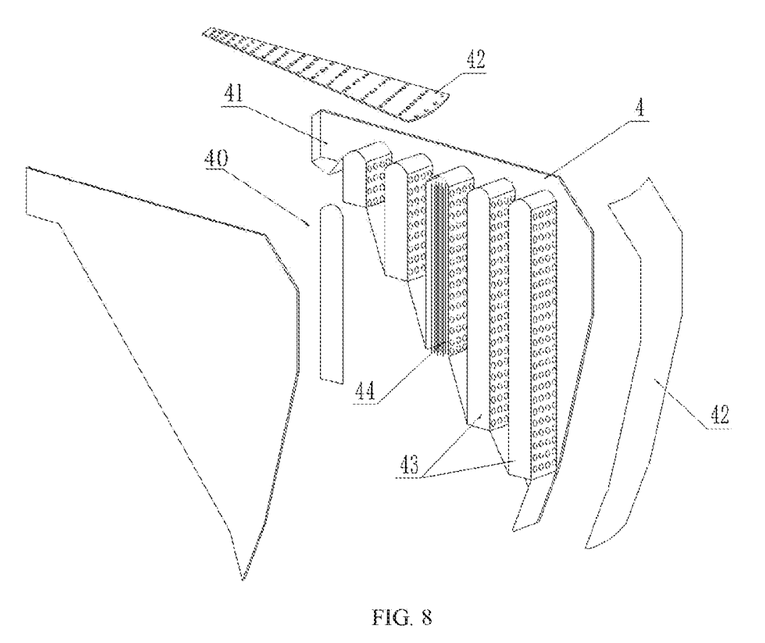
FIG. 8 is an explosive view of a plate assembly in the present disclosure.

As shown in FIG. 8, each of the plate assemblies 4 includes two clamping plates 41 arranged at intervals, a closed plate 42 which is arranged between the two clamping plates 41 and forms a friction chamber 40 with the clamping plates 41, a plurality of diversion trenches 43 arranged inside the friction chamber 40, and a friction rod group 44 arranged inside the diversion trenches 43; and openings are respectively formed in upper and lower ends of the friction chamber 40 and side walls of the diversion trenches 43.

As shown in FIG. 4, the mounting base 2420 is arranged on an inner wall of the upper screening slot 22 through a mounting support 2421.

Figure 9:
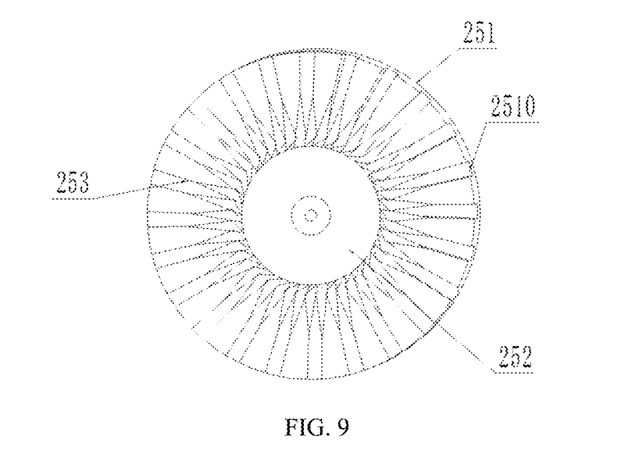
FIG. 9 is a structural schematic diagram of an electrode disc in the present disclosure.
Figure 10:
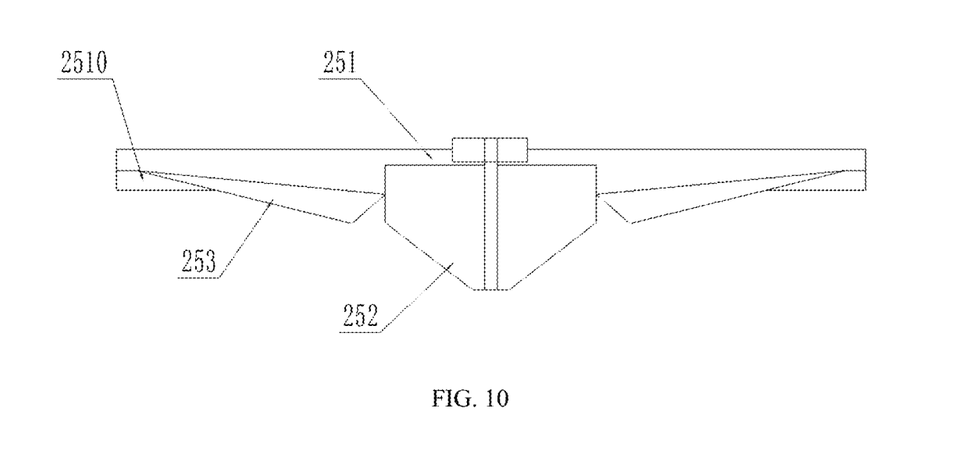
FIG. 10 is a section view of an electrode disc in the present disclosure.

As shown in FIG. 1, the electrode disc 25 is located at an upper end port of the second screening slot 222. As shown in FIG. 9 and FIG. 10, the electrode disc 25 includes a mounting chassis 251, a conical disc 252 arranged on a lower surface of the mounting chassis 251 and coaxial with the mounting chassis 251, and a plurality of electrode plates 253 circumferentially arranged on the mounting chassis 251 along an outer side wall of the conical disc 252. Guide slots 2510 are formed in the mounting chassis 251, and the guide slots 2510 are arranged between the adjacent electrode plates 253 at intervals.

What needs illustration is that the device in the embodiment also includes power supply equipment, a PLC (Programmable Logic Controller) controller. The power supply equipment and the PLC controller are commercially available products. In the embodiment, a water inlet 11 of the device is located at the part close to the lower section in the middle of a side wall of the water collection tank 1. A first water outlet 12 of the device passes through a side wall of the water collection tank 1. A side wall of the treatment tank 31 is arranged on a side wall of the second screening slot 222 and located at the part close to the upper section in the middle of the second screening slot 222. A second water outlet 13 of the device passes through the side wall of the water collection tank 1, is arranged on the side wall of the treatment tank 31, and is located at the part close to the lower section in the middle of the side wall of the treatment tank 31.

According to the device in the embodiment, a method for controlling diffusion of MPs carried with ARGs in a waste water treatment system includes the following steps: waste water enters into the water collection tank 1 through a water inlet 11 of the water collection tank 1; negative pressure is formed inside the second screening slot 222 after the first negative-pressure impeller 223 is driven by the driving assembly to operate; a flowing water flow is formed inside the water collection tank 1; the waste water enters the second screening slot 222 through the first screening slot 211 and the communicating pipe 221 in sequence after penetrating through the screening grill 212 by negative pressure; aeration treatment is carried out through the aeration plate 23 so that air flotation is realized for the MPs carried with ARGs; after the waste water passes through the cushion hopper 241, the MPs carried with ARGs in the waste water rub with the charge friction plate group 242 to be carried with charges; when the water level reaches an upper end face of the second screening slot 222, the MPs carried with charges are adsorbed by the electrode disc 25; water inflows continuously, and the MPs carried with ARGs enters the treatment tank 31; and then, the MPs and ARGs are treated through the first treatment component and the second treatment component respectively. Wherein, the second treatment component is a commercially available feeding device, and is used for feeding adsorbing materials for removing ARGs into the treatment tank 31. The first treatment component is commercially available filter membrane equipment.

Embodiment II

A device for controlling diffusion of MPs carried with ARGs in a waste water treatment system as shown in FIG. 1 and FIG. 2 includes a water collection tank 1 arranged on a mounting rack 10, a collection assembly 2 arranged inside the water collection tank 1 and used for collecting MPs carried with ARGs in waste water, and a treatment assembly 3 arranged inside the water collection tank 1 and used for removing the collected MPs carried with ARGs in waste water.

As shown in FIG. 1 and FIG. 3, the treatment assembly 3 includes a treatment tank 31 arranged inside the water collection tank 1 in a sleeving manner, a first treatment component for treating MPs inside the treatment tank 31, and a second treatment component for treating ARGs inside the treatment tank 31.

As shown in FIG. 1 and FIG. 3, the collection assembly 2 includes a lower screening slot 21 located at a bottom end of the interior of the water collection tank 1, an upper screening slot 22 which is embedded in the treatment tank 31 and provided with a lower port extending into the lower screening slot 21, an aeration plate 23 arranged inside the upper screening slot 22, a charged assembly 24 arranged inside the upper screening slot 22 and located above the aeration plate 23, and an electrode disc 25 located at an upper port of the upper screening slot 22. The aeration plate 23 is a commercially available aeration plate.

The lower screening slot 21 includes a first screening slot 211 of a disc-like structure, and a screening grill 212 arranged on the first screening slot 211.

The upper screening slot 22 includes a communicating pipe 221 which is provided with a lower end penetrating through the screening grill 212 and located inside the first screening pipe 211, and a second screening slot 222 which is connected with an upper end of the communicating pipe 221 and is of a tubular structure. A first negative-pressure impeller 223 is arranged inside the second screening slot 222, and a driving assembly for providing power for the first negative-pressure impeller 223 is arranged on the water collection tank 1. The aeration plate 23 is arranged inside the second screening tank 222, and gas supply equipment connected with the aeration plate 23 is arranged on the water collection tank 1. The aeration plate 23 is a commercially available aeration plate.

The charged assembly 24 includes a cushion hopper 241 which is arranged inside the second screening slot 222 and provided with a cushion notch 2410 in the surface, and a charge friction plate group 242 located directly above the cushion hopper 241.

Figure 5:
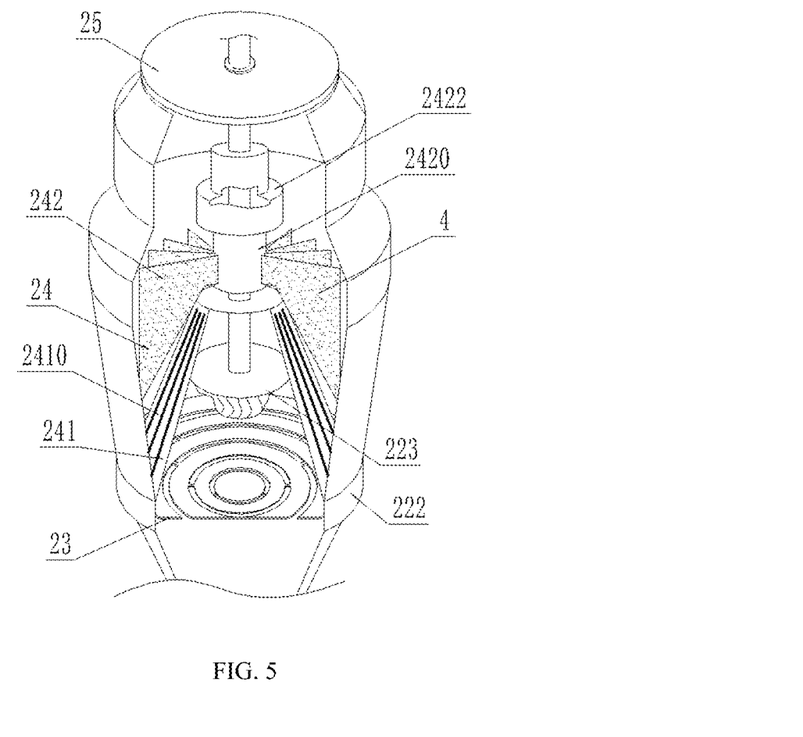
FIG. 5 is a schematic diagram of an internal local structure of an upper screening slot in the second, third and fourth embodiments of the present disclosure.

As shown in FIG. 5, the charge friction plate group 242 includes a mounting base 2420, and a plurality of plate assemblies 4 circumferentially arranged on the mounting base 2420.

As shown in FIG. 8, each of the plate assemblies 4 includes two clamping plates 41 arranged at intervals, a closed plate 42 which is arranged between the two clamping plates 41 and forms a friction chamber 40 with the clamping plates 41, a plurality of diversion trenches 43 arranged inside the friction chamber 40, and a friction rod group 44 arranged inside the diversion trenches 43; and openings are respectively formed in upper and lower ends of the friction chamber 40 and side walls of the diversion trenches 43.

As shown in FIG. 5, the mounting base 2420 is arranged on an output shaft, for providing power for the first negative-pressure impeller 223, of the driving assembly through a shaft sleeve 2422.

As shown in FIG. 1, the electrode disc 25 is located at an upper end port of the second screening slot 222. As shown in FIG. 9 and FIG. 10, the electrode disc 25 includes a mounting chassis 251, a conical disc 252 arranged on a lower surface of the mounting chassis 251 and coaxial with the mounting chassis 251, and a plurality of electrode plates 253 circumferentially arranged on the mounting chassis 251 along an outer side wall of the conical disc 252. Guide slots 2510 are formed in the mounting chassis 251, and the guide slots 2510 are arranged between the adjacent electrode plates 253 at intervals.

What needs illustration is that the device in the embodiment also includes power supply equipment, a PLC (Programmable Logic Controller) controller. The power supply equipment and the PLC controller are commercially available products. In the embodiment, a water inlet 11 of the device is located at the part close to the lower section in the middle of a side wall of the water collection tank 1. A first water outlet 12 of the device passes through a side wall of the water collection tank 1. A side wall of the treatment tank 31 is arranged on a side wall of the second screening slot 222 and located at the part close to the upper section in the middle of the second screening slot 222. A second water outlet 13 of the device passes through the side wall of the water collection tank 1, is arranged on the side wall of the treatment tank 31, and is located at the part close to the lower section in the middle of the side wall of the treatment tank 31.

When in use, the plate assembly 4 can be driven to rotate through the output shaft, and then the contact friction between waste water and the friction rod group 44 is improved.

Embodiment III

A device for controlling diffusion of MPs carried with ARGs in a waste water treatment system as shown in FIG. 1 and FIG. 2 includes a water collection tank 1 arranged on a mounting rack 10, a collection assembly 2 arranged inside the water collection tank 1 and used for collecting MPs carried with ARGs in waste water, and a treatment assembly 3 arranged inside the water collection tank 1 and used for removing the collected MPs carried with ARGs in waste water.

As shown in FIG. 1 and FIG. 3, the treatment assembly 3 includes a treatment tank 31 arranged inside the water collection tank 1 in a sleeving manner, a first treatment component for treating MPs inside the treatment tank 31, and a second treatment component for treating ARGs inside the treatment tank 31.

As shown in FIG. 1 and FIG. 3, the collection assembly 2 includes a lower screening slot 21 located at a bottom end of the interior of the water collection tank 1, an upper screening slot 22 which is embedded in the treatment tank 31 and provided with a lower port extending into the lower screening slot 21, an aeration plate 23 arranged inside the upper screening slot 22, a charged assembly 24 arranged inside the upper screening slot 22 and located above the aeration plate 23, and an electrode disc 25 located at an upper port of the upper screening slot 22.

The lower screening slot 21 includes a first screening slot 211 of a disc-like structure, and a screening grill 212 arranged on the first screening slot 211.

The upper screening slot 22 includes a communicating pipe 221 which is provided with a lower end penetrating through the screening grill 212 and located inside the first screening pipe 211, and a second screening slot 222 which is connected with an upper end of the communicating pipe 221 and is of a tubular structure. A first negative-pressure impeller 223 is arranged inside the second screening slot 222, and a driving assembly for providing power for the first negative-pressure impeller 223 is arranged on the water collection tank 1. The aeration plate 23 is arranged inside the second screening tank 222, and gas supply equipment connected with the aeration plate 23 is arranged on the water collection tank 1. The aeration plate 23 is a commercially available aeration plate.

The charged assembly 24 includes a cushion hopper 241 which is arranged inside the second screening slot 222 and provided with a cushion notch 2410 in the surface, and a charge friction plate group 242 located directly above the cushion hopper 241.

As shown in FIG. 5, the charge friction plate group 242 includes a mounting base 2420, and a plurality of plate assemblies 4 circumferentially arranged on the mounting base 2420.

As shown in FIG. 8, each of the plate assemblies 4 includes two clamping plates 41 arranged at intervals, a closed plate 42 which is arranged between the two clamping plates 41 and forms a friction chamber 40 with the clamping plates 41, a plurality of diversion trenches 43 arranged inside the friction chamber 40, and a friction rod group 44 arranged inside the diversion trenches 43; and openings are respectively formed in upper and lower ends of the friction chamber 40 and side walls of the diversion trenches 43.

As shown in FIG. 5, the mounting base 2420 is arranged on an output shaft, for providing power for the first negative-pressure impeller 223, of the driving assembly through a shaft sleeve 2422.

As shown in FIG. 1, the electrode disc 25 is located at an upper end port of the second screening slot 222. As shown in FIG. 9 and FIG. 10, the electrode disc 25 includes a mounting chassis 251, a conical disc 252 arranged on a lower surface of the mounting chassis 251 and coaxial with the mounting chassis 251, and a plurality of electrode plates 253 circumferentially arranged on the mounting chassis 251 along an outer side wall of the conical disc 252. Guide slots 2510 are formed in the mounting chassis 251, and the guide slots 2510 are arranged between the adjacent electrode plates 253 at intervals.

Figure 6:
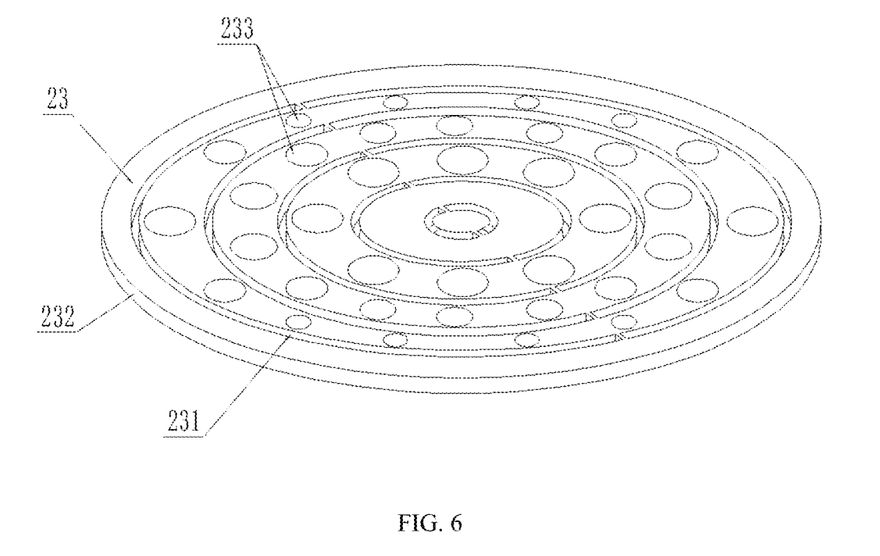
FIG. 6 is a structural schematic diagram of an aeration plate in the third and fourth embodiments of the present disclosure.

Wherein, as shown in FIG. 6, the aeration plate 23 includes an aeration plate body 232 provided with communicating slots 231 in the surface, a plurality of aeration plates 233 embedded in an upper surface of the aeration plate body 232, and a connecting pipeline arranged inside the aeration plate body 232.

Figure 7:
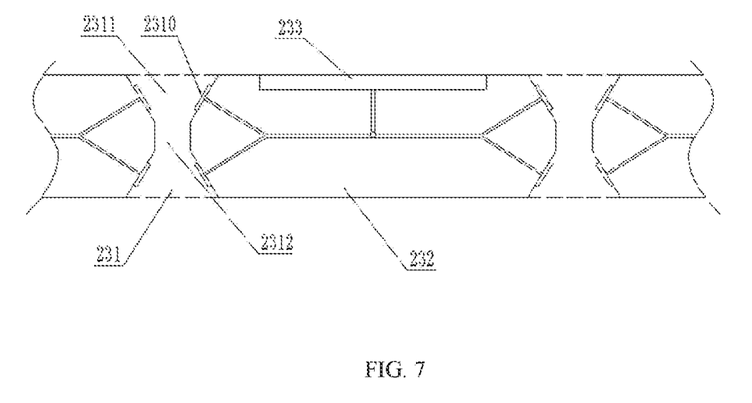
FIG. 7 is a partial section view of an aeration plate in the third and fourth embodiments of the present disclosure.

As shown in FIG. 7, each of the communicating slots 231 includes two V-shaped slots 2311 formed in upper and lower surfaces of the aeration plate body 232 respectively, and a straight slot 2312 for connecting the two V-shaped slots 2311; an aeration port 2310 is formed in a slot wall of the V-shaped slot 2311; and the connecting pipeline is respectively connected with the aeration port 2310 and an aeration disc 233.

What needs illustration is that the device in the embodiment also includes power supply equipment, a PLC (Programmable Logic Controller) controller. The power supply equipment and the PLC controller are commercially available products. In the embodiment, a water inlet 11 of the device is located at the part close to the lower section in the middle of a side wall of the water collection tank 1. A first water outlet 12 of the device passes through a side wall of the water collection tank 1. A side wall of the treatment tank 31 is arranged on a side wall of the second screening slot 222 and located at the part close to the upper section in the middle of the second screening slot 222. A second water outlet 13 of the device passes through the side wall of the water collection tank 1, is arranged on the side wall of the treatment tank 31, and is located at the part close to the lower section in the middle of the side wall of the treatment tank 31.

When in use, sufficient aeration is realized through the aeration plate 23 of a special structure, so that the air flotation effect is improved.

Embodiment IV

A device for controlling diffusion of MPs carried with ARGs in a waste water treatment system as shown in FIG. 1 and FIG. 2 includes a water collection tank 1 arranged on a mounting rack 10, a collection assembly 2 arranged inside the water collection tank 1 and used for collecting MPs carried with ARGs in waste water, and a treatment assembly 3 arranged inside the water collection tank 1 and used for removing the collected MPs carried with ARGs in waste water.

Figure 11:
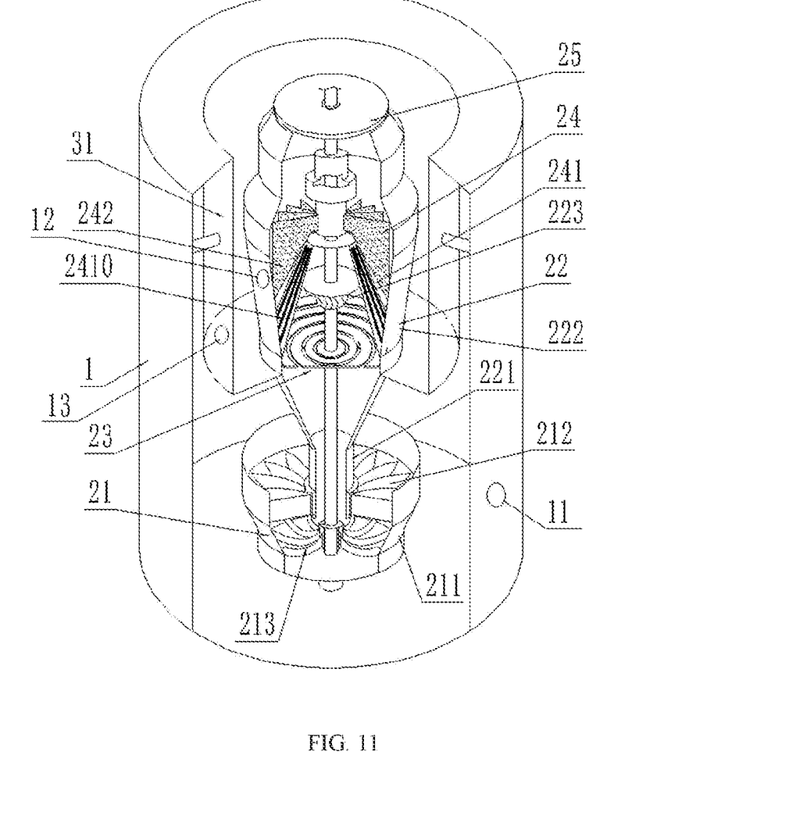
FIG. 11 is a schematic diagram of an internal structure of a water collection tank in the fourth embodiment of the present disclosure.

As shown in FIG. 1 and FIG. 11, the treatment assembly 3 includes a treatment tank 31 arranged inside the water collection tank 1 in a sleeving manner, a first treatment component for treating MPs inside the treatment tank 31, and a second treatment component for treating ARGs inside the treatment tank 31.

As shown in FIG. 1 and FIG. 11, the collection assembly 2 includes a lower screening slot 21 located at a bottom end of the interior of the water collection tank 1, an upper screening slot 22 which is embedded in the treatment tank 31 and provided with a lower port extending into the lower screening slot 21, an aeration plate 23 arranged inside the upper screening slot 22, a charged assembly 24 arranged inside the upper screening slot 22 and located above the aeration plate 23, and an electrode disc 25 located at an upper port of the upper screening slot 22.

The lower screening slot 21 includes a first screening slot 211 of a disc-like structure, and a screening grill 212 arranged on the first screening slot 211.

As shown in FIG. 11, a second negative-pressure impeller 213 is arranged inside the first screening slot 211; the second negative-pressure impeller 213 is located below the screening grill 212, and the second negative-pressure impeller 213 and the first negative-pressure impeller 223 are driven by a same output shaft.

The upper screening slot 22 includes a communicating pipe 221 which is provided with a lower end penetrating through the screening grill 212 and located inside the first screening pipe 211, and a second screening slot 222 which is connected with an upper end of the communicating pipe 221 and is of a tubular structure. A first negative-pressure impeller 223 is arranged inside the second screening slot 222, and a driving assembly for providing power for the first negative-pressure impeller 223 is arranged on the water collection tank 1. The aeration plate 23 is arranged inside the second screening tank 222, and gas supply equipment connected with the aeration plate 23 is arranged on the water collection tank 1. The aeration plate 23 is a commercially available aeration plate.

The charged assembly 24 includes a cushion hopper 241 which is arranged inside the second screening slot 222 and provided with a cushion notch 2410 in the surface, and a charge friction plate group 242 located directly above the cushion hopper 241.

As shown in FIG. 5, the charge friction plate group 242 includes a mounting base 2420, and a plurality of plate assemblies 4 circumferentially arranged on the mounting base 2420.

As shown in FIG. 8, each of the plate assemblies 4 includes two clamping plates 41 arranged at intervals, a closed plate 42 which is arranged between the two clamping plates 41 and forms a friction chamber 40 with the clamping plates 41, a plurality of diversion trenches 43 arranged inside the friction chamber 40, and a friction rod group 44 arranged inside the diversion trenches 43; and openings are respectively formed in upper and lower ends of the friction chamber 40 and side walls of the diversion trenches 43.

As shown in FIG. 5, the mounting base 2420 is arranged on an output shaft, for providing power for the first negative-pressure impeller 223, of the driving assembly through a shaft sleeve 2422.

As shown in FIG. 1, the electrode disc 25 is located at an upper end port of the second screening slot 222. As shown in FIG. 9 and FIG. 10, the electrode disc 25 includes a mounting chassis 251, a conical disc 252 arranged on a lower surface of the mounting chassis 251 and coaxial with the mounting chassis 251, and a plurality of electrode plates 253 circumferentially arranged on the mounting chassis 251 along an outer side wall of the conical disc 252. Guide slots 2510 are formed in the mounting chassis 251, and the guide slots 2510 are arranged between the adjacent electrode plates 253 at intervals.

Wherein, as shown in FIG. 6, the aeration plate 23 includes an aeration plate body 232 provided with communicating slots 231 in the surface, a plurality of aeration plates 233 embedded in an upper surface of the aeration plate body 232, and a connecting pipeline arranged inside the aeration plate body 232.

As shown in FIG. 7, each of the communicating slots 231 includes two V-shaped slots 2311 formed in upper and lower surfaces of the aeration plate body 232 respectively, and a straight slot 2312 for connecting the two V-shaped slots 2311; an aeration port 2310 is formed in a slot wall of the V-shaped slot 2311; and the connecting pipeline is respectively connected with the aeration port 2310 and an aeration disc 233.

What needs illustration is that the device in the embodiment also includes power supply equipment, a PLC (Programmable Logic Controller) controller. The power supply equipment and the PLC controller are commercially available products. In the embodiment, a water inlet 11 of the device is located at the part close to the lower section in the middle of a side wall of the water collection tank 1. A first water outlet 12 of the device passes through a side wall of the water collection tank 1. A side wall of the treatment tank 31 is arranged on a side wall of the second screening slot 222 and located at the part close to the upper section in the middle of the second screening slot 222. A second water outlet 13 of the device passes through the side wall of the water collection tank 1, is arranged on the side wall of the treatment tank 31, and is located at the part close to the lower section in the middle of the side wall of the treatment tank 31.

When in use, first regulation for water flow is realized through the second negative-pressure impeller 213, so that the waste water inside the water collection tank 1 is concentrated towards the lower screening tank 21.

The invention claimed is:

1. A device for controlling diffusion of MPs (Microplastics) carried with ARGs (Antibiotic Resistance Genes) in a waste water treatment system, comprising a water collection tank (1) arranged on a mounting rack (10), a collection assembly (2) arranged inside the water collection tank (1) and used for collecting MPs carried with ARGs in waste water, and a treatment assembly (3) arranged inside the water collection tank (1) and used for removing the collected MPs carried with ARGs in waste water, wherein the treatment assembly (3) comprises a treatment tank (31) arranged inside the water collection tank (1) in a sleeving manner, a filter membrane that treats MPs inside the treatment tank (31), and and a second treatment component for treating ARGs inside the treatment tank (31);

the collection assembly (2) comprises a lower screening slot (21) located at a bottom end of the interior of the water collection tank (1), an upper screening slot (22) which is embedded in the treatment tank (31) and provided with a lower port extending into the lower screening slot (21), an aeration plate (23) arranged inside the upper screening slot (22), a charged assembly (24) arranged inside the upper screening slot (22) and located above the aeration plate (23), and an electrode disc (25) located at an upper port of the upper screening slot (22);

the lower screening slot (21) comprises a first screening slot (211) of a disc structure, and a screening grill (212) arranged on the first screening slot (211);

the upper screening slot (22) comprises a communicating pipe (221) which is provided with a lower end penetrating through the screening grill (212) and located inside the first screening pipe (211), and a second screening slot (222) which is connected with an upper end of the communicating pipe (221) and is of a tubular structure; a first negative-pressure impeller (223) is arranged inside the second screening slot (222), and a driving assembly for providing power for the first negative-pressure impeller (223) is arranged on the water collection tank (1); the aeration plate (23) is arranged inside the second screening tank (222), and gas supply equipment connected with the aeration plate (23) is arranged on the water collection tank (1);

the charged assembly (24) comprises a cushion hopper (241) which is arranged inside the second screening slot (222) and provided with a cushion notch (2410) in the surface, and a charge friction plate group (242) located directly above the cushion hopper (241);

the electrode disc (25) is located at an upper end port of the second screening slot (222).

2. The device for controlling diffusion of MPs carried with ARGs in a waste water treatment system according to claim 1, wherein a second negative-pressure impeller (213) is arranged inside the first screening slot (211); the second negative-pressure impeller (213) is located below the screening grill (212), and the second negative-pressure impeller (213) and the first negative-pressure impeller (223) are driven by a same output shaft.

3. The device for controlling diffusion of MPs carried with ARGs in a waste water treatment system according to claim 1, wherein the aeration plate (23) comprises an aeration plate body (232) provided with communicating slots (231) in the surface, a plurality of aeration plates (233) embedded in an upper surface of the aeration plate body (232), and a connecting pipeline arranged inside the aeration plate body (232).

4. The device for controlling diffusion of MPs carried with ARGs in a waste water treatment system according to claim 3, wherein each of the communicating slots (231) comprises two V-shaped slots (2311) formed in upper and lower surfaces of the aeration plate body (232) respectively, and a straight slot (2312) for connecting the two V-shaped slots (2311); an aeration port (2310) is formed in a slot wall of the V-shaped slot (2311); and the connecting pipeline is respectively connected with the aeration port (2310) and an aeration disc (233).

5. The device for controlling diffusion of MPs carried with ARGs in a waste water treatment system according to claim 1, wherein the charge friction plate group (242) comprises a mounting base (2420), and a plurality of plate assemblies (4) circumferentially arranged on the mounting base (2420);

each of the plate assemblies (4) comprises two clamping plates (41) arranged at intervals, a closed plate (42) which is arranged between the two clamping plates (41) and forms a friction chamber (40) with the clamping plates (41), a plurality of diversion trenches (43) arranged inside the friction chamber (40), and a friction rod group (44) arranged inside the diversion trenches (43); and openings are respectively formed in upper and lower ends of the friction chamber (40) and side walls of the diversion trenches (43).

6. The device for controlling diffusion of MPs carried with ARGs in a waste water treatment system according to claim 5, wherein the mounting base (2420) is arranged on an inner wall of the upper screening slot (22) through a mounting support (2421).

7. The device for controlling diffusion of MPs carried with ARGs in a waste water treatment system according to claim 5, wherein the mounting base (2420) is arranged on an output shaft, for providing power for the first negative-pressure impeller (223), of the driving assembly through a shaft sleeve (2422).

8. The device for controlling diffusion of MPs carried with ARGs in a waste water treatment system according to claim 1, wherein the electrode disc (25) comprises a mounting chassis (251), a conical disc (252) arranged on a lower surface of the mounting chassis (251) and coaxial with the mounting chassis (251), and a plurality of electrode plates (253) circumferentially arranged on the mounting chassis (251) along an outer side wall of the conical disc (252).

9. The device for controlling diffusion of MPs carried with ARGs in a waste water treatment system according to claim 8, wherein guide slots (2510) are formed in the mounting chassis (251), and the guide slots (2510) are arranged between two adjacent electrode plates of the electrode plates (253).

10. A method for controlling diffusion of MPs carried with ARGs in a waste water treatment system, based on the device according to claim 9, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

11. A method for controlling diffusion of MPs carried with ARGs in a waste water treatment system, based on the device according to claim 8, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

12. A method for controlling diffusion of MPs carried with ARGs in a waste water treatment system, based on the device according to claim 7, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

13. A method for controlling diffusion of MPs carried with ARGs in a waste water treatment system, based on the device according to claim 6, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

14. A method for controlling diffusion of MPs carried with ARGs in a waste water treatment system, based on the device according to claim 5, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

15. A method for controlling diffusion of MPs carried with ARGs in a waste water treatment system, based on the device according to claim 4, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

16. A method for controlling diffusion of MPs carried with ARGs in a waste water treatment system, based on the device according to claim 3, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

17. A method for controlling diffusion of MPs carried with ARGs in a waste water treatment system, based on the device according to claim 2, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

18. A method for controlling diffusion of MPs carried with ARGs in a waste water treatment system, based on the device according to claim 1, comprising the following steps: waste water enters into the water collection tank (1) through a water inlet of the water collection tank (1); negative pressure is formed inside the second screening slot (222) after the first negative-pressure impeller (223) is driven by the driving assembly to operate; a flowing water flow is formed inside the water collection tank (1); the waste water enters the second screening slot (222) through the first screening slot (211) and the communicating pipe (221) in sequence after penetrating through the screening grill (212) by negative pressure; aeration treatment is carried out through the aeration plate (23) so that air flotation is realized for the MPs carried with ARGs; after the waste water passes through the cushion hopper (241), the MPs carried with ARGs in the waste water rub with the charge friction plate group (242) to be carried with charges; when the water level reaches an upper end face of the second screening slot (222), the MPs carried with charges are adsorbed by the electrode disc (25); water inflows continuously, and the MPs carried with ARGs enters the treatment tank (31); and then, the MPs and ARGs are treated through the filter membrane and the second treatment component respectively.

\* \* \* \* \*